United States Patent
Sonobe et al.

(10) Patent No.: US 12,411,011 B2
(45) Date of Patent: Sep. 9, 2025

(54) SHIP NAVIGATION ASSISTANCE DEVICE, SHIP NAVIGATION ASSISTANCE METHOD, AND SHIP NAVIGATION ASSISTANCE PROGRAM

(71) Applicant: FURUNO ELECTRIC CO., LTD., Hyogo (JP)

(72) Inventors: Tatsuya Sonobe, Ikeda (JP); Hiroyuki Toda, Nishinomiya (JP); Hiraku Nakamura, Tokyo (JP); Kazuki Tsujimoto, Amagasaki (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 284 days.

(21) Appl. No.: 18/174,408

(22) Filed: Feb. 24, 2023

(65) Prior Publication Data

US 2023/0228572 A1    Jul. 20, 2023

Related U.S. Application Data

(63) Continuation-in-part of application No. PCT/JP2021/026772, filed on Jul. 16, 2021.

(30) Foreign Application Priority Data

Aug. 24, 2020 (JP) .................. 2020-140551

(51) Int. Cl.
*G01C 21/16* (2006.01)
*G01C 21/20* (2006.01)

(52) U.S. Cl.
CPC ..... *G01C 21/1652* (2020.08); *G01C 21/1656* (2020.08); *G01C 21/203* (2013.01)

(58) Field of Classification Search
CPC ............ G01C 21/1652; G01C 21/1656; G01C 21/203; B63B 2021/003; B63B 49/00; B63B 39/14; G05D 1/0206
See application file for complete search history.

(56) References Cited

U.S. PATENT DOCUMENTS

| | | | |
|---|---|---|---|
| 2019/0308713 A1 | 10/2019 | Akuzawa et al. | |
| 2019/0359300 A1 | 11/2019 | Johnson et al. | |
| 2021/0347449 A1* | 11/2021 | Dake .................. | B63B 79/40 |

FOREIGN PATENT DOCUMENTS

| | | |
|---|---|---|
| CN | 104615880 A | 5/2015 |
| CN | 105842724 A | 8/2016 |

(Continued)

OTHER PUBLICATIONS

The extended European search report issued by the European Patent Office on Sep. 4, 2024, which corresponds to European Application No. 21861038.4-1009 and is related to U.S. Appl. No. 18/174,408.

(Continued)

*Primary Examiner* — Yuen Wong
(74) *Attorney, Agent, or Firm* — Studebaker Brackett PLLC

(57) ABSTRACT

The purpose of the present disclosure is to set the initial information of the anchoring object (target) of a ship with high accuracy. A ship navigation assistance system according to the present disclosure includes a provisional initial information specifier, a measurement sensor and processing circuitry. The provisional initial information specifier may accept a specification of provisional initial information for characteristic information on an object to which a ship anchors or docks (docks to a pier). The measurement sensor may acquire measurement information on an object using a ranging result of an area including the object.

16 Claims, 13 Drawing Sheets

(56) References Cited

FOREIGN PATENT DOCUMENTS

| | | | |
|---|---|---|---|
| CN | 115551779 | A | 12/2022 |
| EP | 3663741 | A1 | 6/2020 |
| EP | 3865395 | A1 | 8/2021 |
| JP | 2005-061893 | A | 3/2005 |
| JP | 2007-041499 | A | 2/2007 |
| JP | 2007-106397 | A | 4/2007 |
| JP | 2011-169801 | A | 9/2011 |
| JP | 2012-161444 | A | 8/2012 |
| JP | 5000244 | B2 | 8/2012 |
| JP | 2019-079352 | A | 5/2019 |
| JP | 2020-059403 | A | 4/2020 |
| WO | 2018/100746 | A1 | 6/2018 |
| WO | WO2019-004362 | A1 | 4/2020 |

OTHER PUBLICATIONS

International Search Report issued in PCT/JP2021/026772; mailed Sep. 21, 2021.

\* cited by examiner

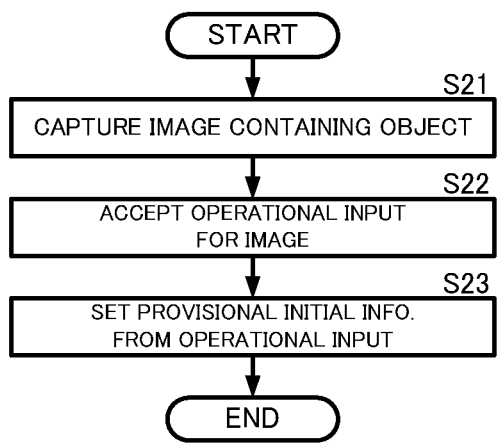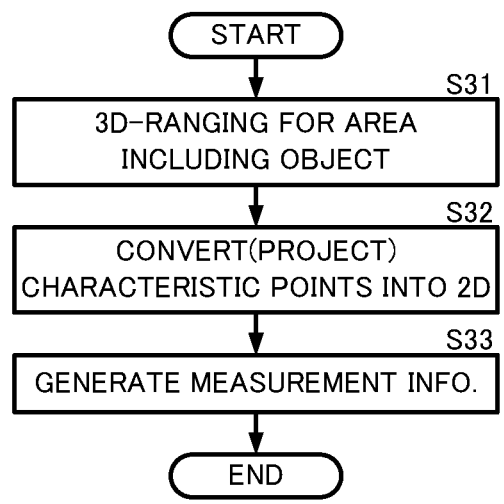

SHIP NAVIGATION ASSISTANCE DEVICE, SHIP NAVIGATION ASSISTANCE METHOD, AND SHIP NAVIGATION ASSISTANCE PROGRAM

CROSS-REFERENCE TO RELATED APPLICATION(S)

This application is a continuation-in-part of PCT International Application No. PCT/JP2021/026772, which was filed on Jul. 16, 2021, and which claims priority to Japanese Patent Application No. 2020-140551 filed on Aug. 24, 2020, the entire disclosures of each of which are herein incorporated by reference for all purposes.

TECHNICAL FIELD

The present disclosure relates to a ship navigation assistance technology which is used when anchoring a ship.

BACKGROUND

In Patent Document 1, a docking assistance device for a ship is disclosed. In the docking assistance device disclosed in Patent Document 1, a docking candidate position is specified by a user using a touch panel.

REFERENCE DOCUMENT(S) OF CONVENTIONAL ART

[Patent Document 1] JP5000244B2

DESCRIPTION OF THE DISCLOSURE

However, in the conventional art, a docking candidate position is specified by a user, which causes an error for an actual docking candidate position. Such errors are not limited to a docking candidate position, but equally occur for the initial information of other objects to which the vessel intends to anchor.

Thus, one purpose of the present disclosure is to set the initial information of the anchoring object (target) of a ship with high accuracy.

SUMMARY

A ship navigation assistance system (a/k/a a ship navigation assistance device) according to the present disclosure includes a provisional initial information specifier, a measurement sensor and processing circuitry. The provisional initial information specifier may accept a specification of provisional initial information for characteristic information on an object to which a ship anchors or docks (docks to a pier). The measurement sensor may acquire measurement information on an object using a ranging result of an area including the object. The processing circuitry may set the initial information of the characteristic information on the target using the provisional initial information and the measurement information.

According to this configuration, the initial information of the characteristic information on the object (target), such as a quay line to which a ship intends to anchor or dock, can be set in accordance with the measurement information based on the ranging result.

According to the present disclosure, the initial information of the anchoring object (target) of a ship can be set with high accuracy.

BRIEF DESCRIPTION OF DRAWINGS

FIGS. 9A, 9B, and 9C are a flowchart illustrating a concrete process flow of each process of the ship navigation assistance method illustrated in FIG. 8A.

DETAILED DESCRIPTION

Figure 1:
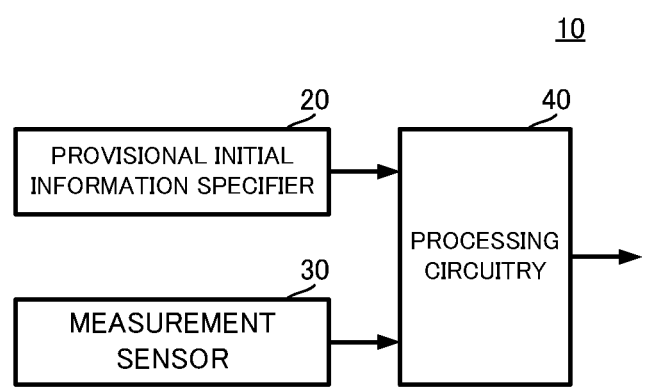
FIG. 1 is a functional block diagram illustrating a configuration of a ship navigation assistance system according to one embodiment of the present disclosure.
Figure 2:
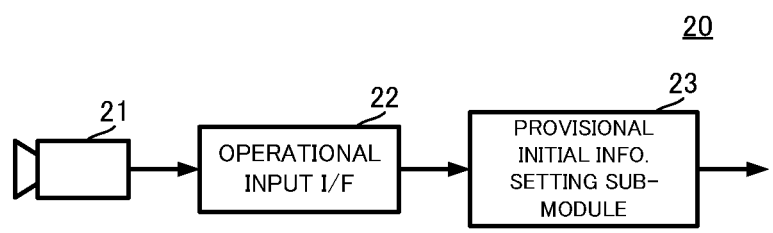
FIG. 2 is a functional block diagram illustrating a configuration of a provisional initial information specifier.
Figure 3:
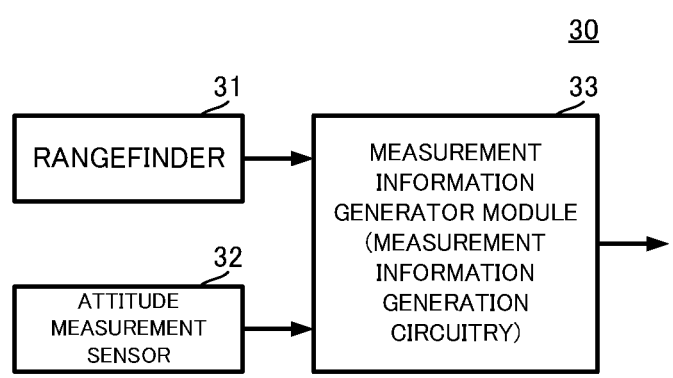
FIG. 3 is a functional block diagram illustrating a configuration of a measurement sensor.
Figure 4:
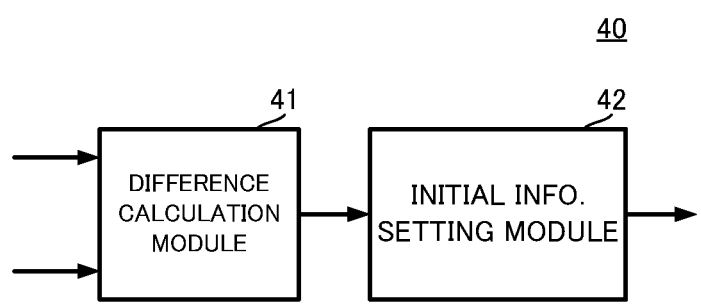
FIG. 4 is a functional block diagram illustrating a configuration of processing circuitry.

A ship navigation assistance technology according to one embodiment of the present disclosure is described with reference to the drawings. FIG. 1 is a functional block diagram illustrating a configuration of a ship navigation assistance system according to one embodiment of the present disclosure. FIG. 2 is a functional block diagram illustrating a configuration of a provisional initial information specifier. FIG. 3 is a functional block diagram illustrating a configuration of a measurement sensor. FIG. 4 is a functional block diagram illustrating a configuration of processing circuitry.

(Outline Configuration of Ship Navigation Assistance System 10)

As illustrated in FIG. 1, the ship navigation assistance system 10 may include a provisional initial information specifier 20, a measurement sensor 30, and processing circuitry 40. The ship navigation assistance system 10 may be realizable, for example, by a memory device which stores a program (ship navigation assistance program) for implementing a ship navigation assistance method, and processing circuitry, such as a CPU, for executing the ship navigation assistance program, except for optical-system modules and radio-wave-system modules. Further, the modules of the memory device and the processing circuitry may also be realized by an IC etc. in which the navigation assistance program is incorporated.

The provisional initial information specifier 20 may accept a specification of provisional initial information for characteristic information on an object to which a ship anchors or docks (docks to a pier). The provisional initial information specifier 20 may output the provisional initial information to the processing circuitry 40. For example, the object may be a quay (wall), the characteristic information may be a vector quantity of a quay line, and the provisional initial information may be a provisional quay line (vector quantity).

The measurement sensor 30 may range or measure a distance to an area including the object to which the ship anchors or docks (docks to a pier). The measurement sensor 30 may acquire measurement information on the object using the ranging result. The measurement sensor 30 may output the measurement information to the processing circuitry 40. For example, the measurement information may be a vector quantity of a line segment (straight line).

The processing circuitry 40 may set the initial information of the characteristic information on the object using provisional initial information and the measurement information. The initial information of the characteristic information on the object may be, for example, an initial quay line (vector quantity).

Thus, the ship navigation assistance system 10 sets the initial information of the target (e.g., the initial quay line) based on the ranging result. Therefore, the ship navigation assistance system 10 can suppress the error of the initial information of the target and can set the initial information of the anchoring object (target) of a ship with high accuracy. Thus, the ship navigation assistance system 10 can suppress the initial error when following the object (target).

(Configuration of Provisional Initial Information Specifier 20)

As illustrated in FIG. 2, the provisional initial information specifier 20 may include an image capturer, such as a camera, 21, an operational input interface 22, and a provisional initial information setting sub-module 23. The provisional initial information setting sub-module 23 can be implemented as provisional initial information setting circuitry.

The image capturer (camera) 21 may be connected to the operational input interface 22. The image capturer (camera) 21 may capture an image of the area including the object (for example, a quay). The image capturer (camera) 21 may output the captured image to the operational input interface 22.

The operational input interface 22 may be, for example, realized by a touch panel. The operational input interface 22 may display the inputted image. The operational input interface 22 may accept an operational input from a user, and detect an operated position on the image (a locus of the operation). The operational input interface 22 may output the operated position (the locus of the operation) to the provisional initial information setting sub-module 23.

The provisional initial information setting sub-module 23 may convert the operated position (the locus of the operation) into a vector quantity in a three-dimensional coordinate system which is set to the image, and set up it as provisional initial information. The provisional initial information setting sub-module 23 may output the provisional initial information to the processing circuitry 40.

(Concrete Example of Method of Specifying Provisional Initial Information)

Figure 5:
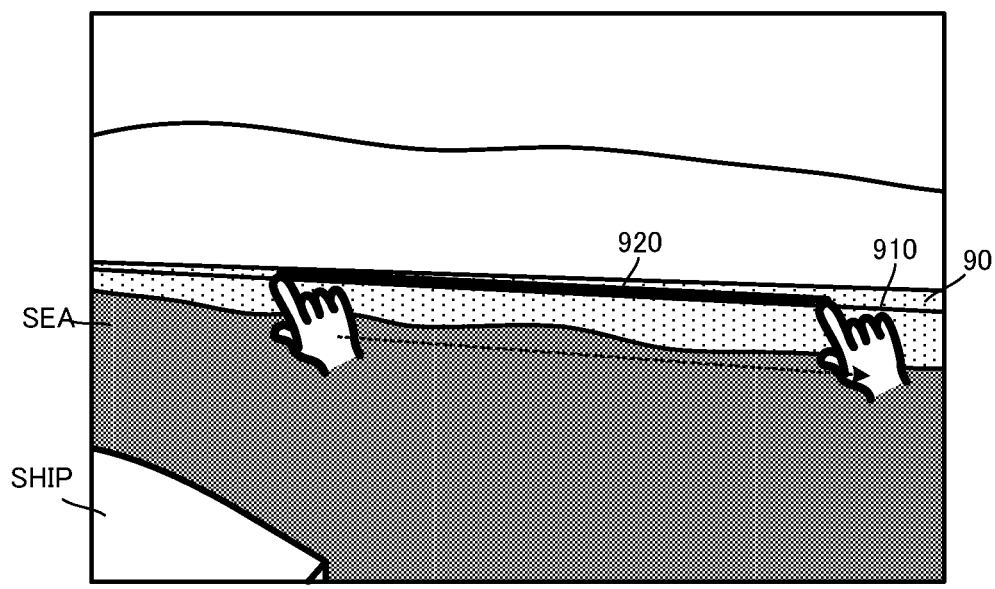
FIG. 5 is a view illustrating one example of a method of specifying provisional initial information.

FIG. 5 is a view illustrating one example of a method of specifying the provisional initial information. As illustrated in FIG. 5, the image including a quay 90 which is the object may be displayed on a display screen. When the user operates the touch panel with his/her finger so as to follow a quay line 910 displayed on the screen, the operational input interface 22 may detect the locus of the operation (a locus corresponding to a provisional quay line 920 in FIG. 5). In more detail, the operational input interface 22 may detect a group of pixels (a group of coordinates of the pixels) which are operated with the finger in the image, as the locus. The operational input interface 22 may output this locus to the provisional initial information setting sub-module 23.

The provisional initial information setting sub-module 23 may set this locus as the provisional quay line 920. The provisional quay line 920 may be expressed, for example, by a vector quantity which is set based on a direction and a distance on the basis of the position of the ship. The provisional quay line 920 may correspond to the provisional initial information. The provisional initial information setting sub-module 23 may output the provisional quay line 920 to the processing circuitry 40.

(Configuration of Measurement Sensor 30)

As illustrated in FIG. 3, the measurement sensor 30 may include a rangefinder 31, an attitude measurement sensor 32, and a measurement information generator module 33. The measurement information generator module 33 can be implemented as measurement information generation circuitry.

The rangefinder 31 may be realized by a LIDAR, for example. Note that the rangefinder 31 may be a LADAR, or other distance measuring equipment, such as optical-based or radio-wave-based equipment. The rangefinder 31 may perform a three-dimensional ranging for the area including the object to detect a plurality of characteristic points. The rangefinder 31 may output the plurality of characteristic points to the measurement information generator module 33.

The attitude measurement sensor 32 may be, for example, realized by an attitude sensor provided to the ship. Note that the attitude sensor may use a positioning technique of GNSS signals, or may use an inertia sensor. Further, the attitude sensor may combine the positioning technique of the GNSS signals and the inertia sensor. When the positioning technique of the GNSS signals is used, the position (positional coordinates) of the ship can also be measured. Further, when the positioning technique of the GNSS signals is used, the attitude can be measured with high precision in an open-sky situation, like on the sea.

The attitude measurement sensor 32 may measure the attitude of the ship. The attitude measurement sensor 32 may output the attitude of the ship to the measurement information generator module 33.

The measurement information generator module 33 may convert (project) the plurality of characteristic points obtained by three-dimensional coordinates into a two-dimensional coordinate system on a horizontal plane. Here, the measurement information generator module 33 can convert the plurality of characteristic points in the three-dimensional coordinate system into the two-dimensional coordinate system on the horizontal plane with high precision by utilizing the attitude of the ship, for example, even if the ship rolls or pitches.

The measurement information generator module 33 may apply a given conversion process to the plurality of characteristic points disposed at the two-dimensional coordinates on the horizontal plane to generate the measurement information. The measurement information generator module 33 may output the generated measurement information to the processing circuitry 40.

Note that the processing for converting the plurality of characteristic points obtained by the three-dimensional coordinates into the two-dimensional coordinate system on the horizontal plane can be omitted. However, by performing this processing, the initial information of the characteristic information on the object can be set with high accuracy, and, for example, processing in the later stages can be facilitated.

(Specific Example of a Method of Generating Measurement Information)

Figure 6:
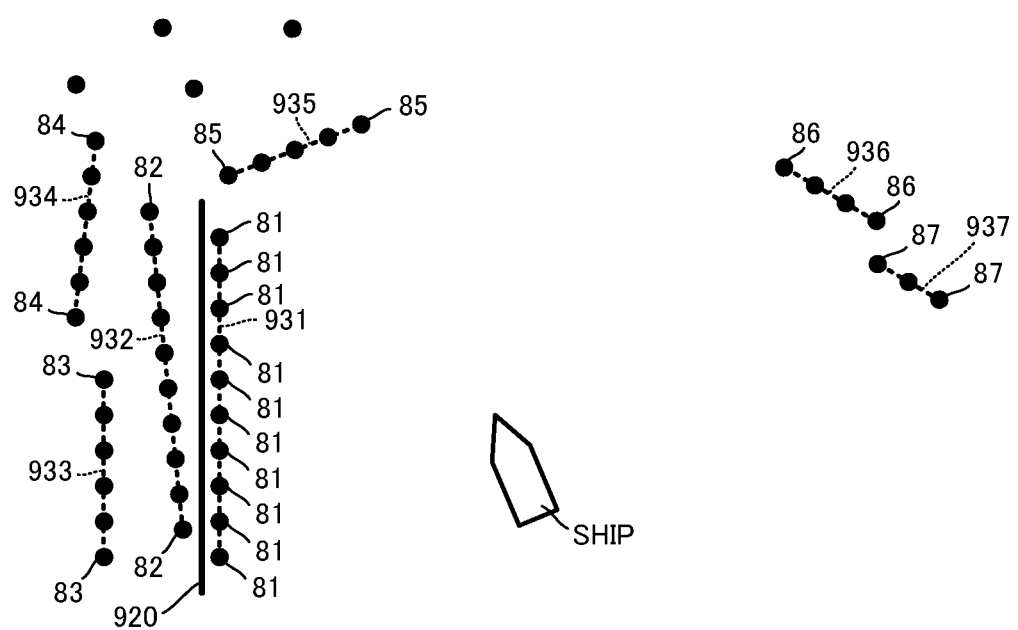
FIG. 6 is a view illustrating one example of a method of generating measurement information.

FIG. 6 is a view illustrating one example of a method of generating measurement information. FIG. 6 shows a bird's-eye view of a LIDAR detection result. Here, FIG. 6 shows a case when a LIDAR is used as a rangefinder 31.

The rangefinder 31 performs three-dimensional ranging on the area including the quay line 910 (not illustrated). As a result, the rangefinder 31 detects multiple characteristic points 81, 82, 83, 84, 85, 86, and 87, as illustrated in FIG. 6. The rangefinder 31 outputs these multiple characteristic points 81, 82, 83, 84, 85, 86 and 87 to a measurement information generator module 33.

The measurement information generator module 33 generates measurement lines 931, 932, 933, 81, 82, 83, 84, 85, 86, 87 by applying Hough transformation or the like to the multiple characteristic points 934, 935, 936, 937. Measurement lines 931, 932, 933, 934, 935, 936 and 937 correspond to measurement information. More specifically, the measurement information generator module 33 generates a measurement line 931 from a plurality of characteristic points 81 arranged in a straight line, and generates a measurement line 932 from a plurality of characteristic points 82 arranged in a straight line. Similarly, the measurement information generator module 33 generates measurement line 933 from the multiple characteristic points 83, generates measurement line 934 from the multiple characteristic points 84, generates measurement line 935 from the multiple characteristic points 85, generates measurement line 936 from the multiple characteristic points 86, and generates measurement line 937 from the multiple characteristic points 87. These measurement lines 931, 932, 933, 934, 935, 936 and 937 are represented by a vector quantity which is set based on a direction and a distance on the basis of the position of the ship. The measurement information generator module 33 outputs these measurement lines 931, 932, 933, 934, 935, 936 and 937 to the processing circuitry 40.

(More Concrete Description of Processing Circuitry 40)

As illustrated in FIG. 4, the processing circuitry 40 may include a difference calculation module 41 and the initial information setting module 42.

The difference calculation module 41 may receive the provisional initial information from the provisional initial information setting sub-module 23 and the measurement information from measurement information generator module 33. The difference calculation module 41 may compare the provisional initial information and the measurement information, and calculate and output the difference between each pair of the provisional initial information and the measurement information to the initial information setting module 42.

The initial information setting module 42 may compare each pair of the provisional initial information and the measurement information. The initial information setting module 42 may detect the measurement information which constitutes the least difference pair with the provisional initial information as a maximum likelihood measurement information.

The initial information setting module 42 may set the maximum likelihood measurement information as the initial information of the characteristic information.

(Specific Example of a Method of Setting Initial Information)

Figure 7:
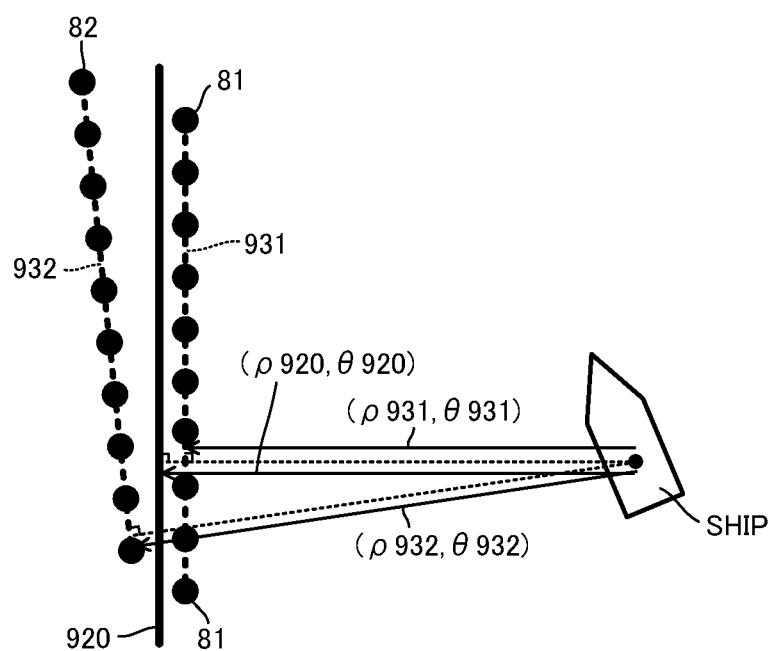
FIG. 7 is a view illustrating one example of a method of setting initial information.

FIG. 7 is a view illustrating one example of a method of setting initial information. FIG. 7 illustrates the concept of comparing the measurement line 931 and the measurement line 932 with a provisional quay line 920, but the same concept may apply to other measurement lines.

By the above processing, the provisional quay line 920 may be acquired as a vector quantity ($\rho 920$, $\theta 920$) which is set based on a direction and a distance on the basis of the position of the ship. The measurement line 931 may be acquired as a vector quantity ($\rho 931$, $\theta 931$) which is set based on a direction and a distance on the basis of the position of the ship, and the measurement line 932 may be acquired as a vector quantity ($\rho 932$, $\theta 932$) which is set based on a direction and a distance on the basis of the position of the ship.

The difference calculation module 41 may calculate a difference between the provisional quay line 920 and the measurement line 931. In more detail, the difference calculation module 41 may calculate a distance difference $\Delta \rho 1$, direction difference $\Delta \theta 1$ between the vector quantity ($\rho 920$, $\theta 920$) and the vector quantity ($\rho 931$, $\theta 931$). Similarly, the difference calculation module 41 may calculate a difference between the provisional quay line 920 and the measurement line 932. In more detail, the difference calculation module 41 may calculate a distance difference $\Delta \rho 2$, direction difference $\Delta \theta 2$ between the vector quantity ($\rho 920$, $\theta 920$) and the vector quantity ($\rho 932$, $\theta 932$).

In this case, the difference calculation module 41 may store the bias error between the image coordinate system and the ranging coordinate system in advance, and it is preferable to calculate the distance difference and the direction difference after the correction with this bias error. Thus, the difference calculation module 41 may calculate the distance difference and the direction difference with high accuracy.

Initial information setting module 42 may detect a pair of provisional quay lines and measurement lines having the minimum distance difference $\Delta \rho$, may detect the measurement line constituting this pair as a maximum likelihood measurement line, and may set the maximum likelihood measurement line as an initial quay line. Alternatively, the initial information setting module 42 may detect a pair of provisional quay lines and measurement lines having the minimum direction difference $\Delta \theta$, may detect the measurement line constituting this pair as a maximum likelihood measurement line, and may set the maximum likelihood measurement line as an initial quay line.

Alternatively, the initial information setting module 42 may set the initial quay line by comprehensively reflecting the distance difference $\Delta \rho$ and the direction difference $\Delta \theta$. For example, the initial information setting module 42 may set a distance evaluation value according to the distance difference $\Delta \rho$, and may set a direction evaluation value according to the direction difference $\Delta \theta$. The initial information setting module 42 may determine the maximum likelihood measurement line using the distance evaluation value and the direction evaluation value. The initial information setting module 42 may set the maximum likelihood measurement line as the initial quay line.

For example, in the example of FIG. 7, the measurement line 931 may be detected as the maximum likelihood measurement line for the provisional quay line 920 and may be set as the initial quay line.

As described above, with the above configuration, the ship navigation assistance system 10 may set the initial information (the initial quay line) of the target (for example, a quay) with high accuracy.

(Ship Navigation Assistance Method)

In the above description, each processing may be performed by an individual functional module. However, the above processing can be implemented by being stored as a ship navigation assistance program and being executed by processing circuitry. In this case, the processing may be executed according to the flow illustrated in each of the following drawings. Note that, in the concrete contents of the processing in the following description, the detailed description of the above-described contents is omitted.

Figure 8A:
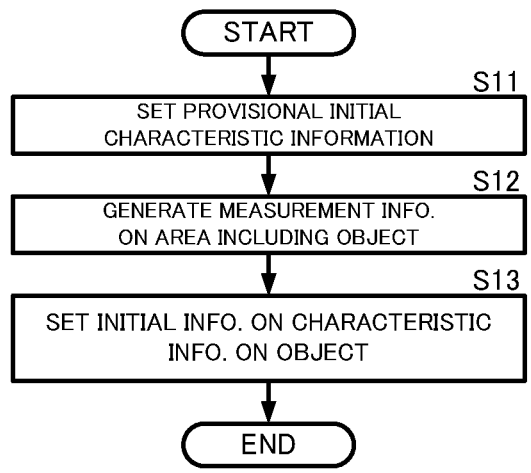
FIGS. 8A and 8B are flowcharts illustrating outline processing of a ship navigation assistance method.
Figure 8B:
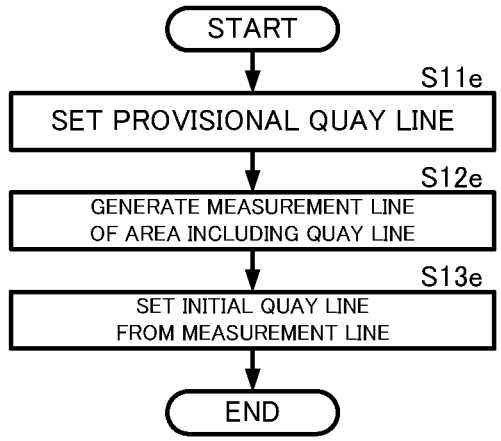

FIGS. 8A and 8B are flowcharts illustrating outline processings of the ship navigation assistance method. FIG. 8B illustrates a case where the processing of FIG. 8A is set for a more concrete object (quay).

As illustrated in FIG. 8A, the processing circuitry (the ship navigation assistance system) may set the provisional initial information on the object (S11). The processing circuitry may generate the measurement information on the area including the object (S12). The processing circuitry may set the initial information of the characteristic information on the object based on the measurement information (S13).

As a more specific example, when the object (target) is a quay, as illustrated in FIG. 8B, the processing circuitry may accept the provisional quay line (S11e). The processing circuitry may generate the measurement line of the area including the quay line (S12e). The processing circuitry may set the initial quay line from the measurement line (S13e).

FIGS. 9A, 9B, and 9C are a flowchart illustrating a concrete process flow of each process of the ship navigation assistance method illustrated in FIG. 8A.

As illustrated in FIG. 9A, in the specifying process of the provisional initial information, the processing circuitry may capture an image containing the object (target) (S21). The processing circuitry may accept operational input for the image (S22). The processing circuitry may set provisional initial information from the contents of the operational input (S23).

As illustrated in FIG. 9B, in the measurement information generating process, the processing circuitry may perform a three-dimensional ranging for the area including the object to detect a plurality of characteristic points (S31). The processing circuitry may convert (project) the plurality of characteristic points obtained by three-dimensional coordinates into a two-dimensional coordinate system by using the attitude data of the ship (S32). The processing circuitry may apply a given conversion process to the plurality of characteristic points disposed at the two-dimensional coordinates to generate the measurement information (S33).

As illustrated in FIG. 9C, in the initial information setting process, if the number of measurement information on the object is one (S41: YES), the processing circuitry may set this measurement information (generated measurement information) as the initial information of the characteristic information on the object (target) (S42).

If there are a plurality of the measurement information on the object (S41: NO), the processing circuitry may compare the provisional initial information and the plurality of the measurement information (S43). The processing circuitry may detect the maximum likelihood measurement information based on the comparison results (S44). More specifically, for example, the processing may be executed according to the flow illustrated in FIG. 10.

Figure 10:
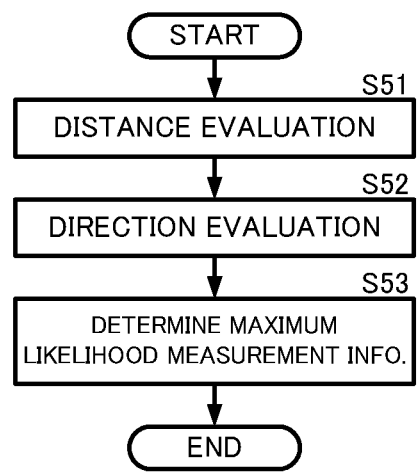
FIG. 10 is a flowchart illustrating one example of a method of detecting maximum likelihood measurement information.

FIG. 10 is a flowchart illustrating one example of a method of detecting maximum likelihood measurement information. The processing circuitry may perform the distance evaluation based on the plurality of the measurement information (S51). The distance evaluation may be performed by using the distance difference between the distance from the ship to the measurement information and the distance from the ship to the provisional initial information, and, for example, the smaller the distance difference may be, the more highly the distance evaluation value may be set.

The processing circuitry may perform the direction evaluation based on the plurality of the measurement information (S52). The direction evaluation may be performed by using the direction difference between the direction from the ship to the measurement information and the direction from the ship to the provisional initial information, and, for example, the smaller the direction difference may be, the more highly the direction evaluation value may be set.

The processing circuitry may determine the maximum likelihood measurement information from the distance evaluation value and the direction evaluation value (S53). For example, the processing circuitry may set a weighting coefficient for distance and a weighting coefficient for direction, may multiply the weighting coefficient for distance by the distance evaluation value, and may multiply the weighting coefficient for direction by the direction evaluation value. The processing circuitry may calculate an overall evaluation value by adding these values, and may set the measurement information with the highest overall evaluation value as the maximum likelihood measurement information. The method of setting the maximum likelihood measurement information is not limited to this, but at least one of distance difference and direction difference may be used. For example, the processing circuitry can set the maximum likelihood measurement information considering only the distance difference or the maximum likelihood measurement information considering only the direction difference.

Returning to FIG. 9, the processing circuitry may set the maximum likelihood measurement information to the initial information of the characteristic information of the object (S45).

Figure 11A:
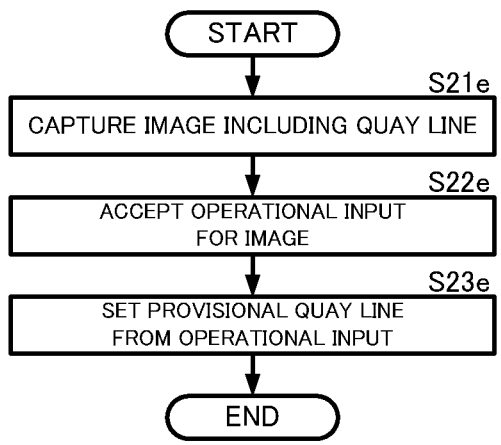
FIGS. 11A, 11B, and 11C are an example illustrating processing illustrated in FIGS. 9A, 9B, and 9C being set to a more concrete object (quay).
Figure 11B:
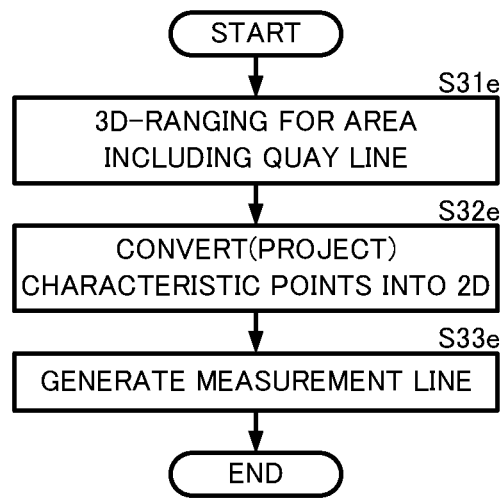
Figure 11C:
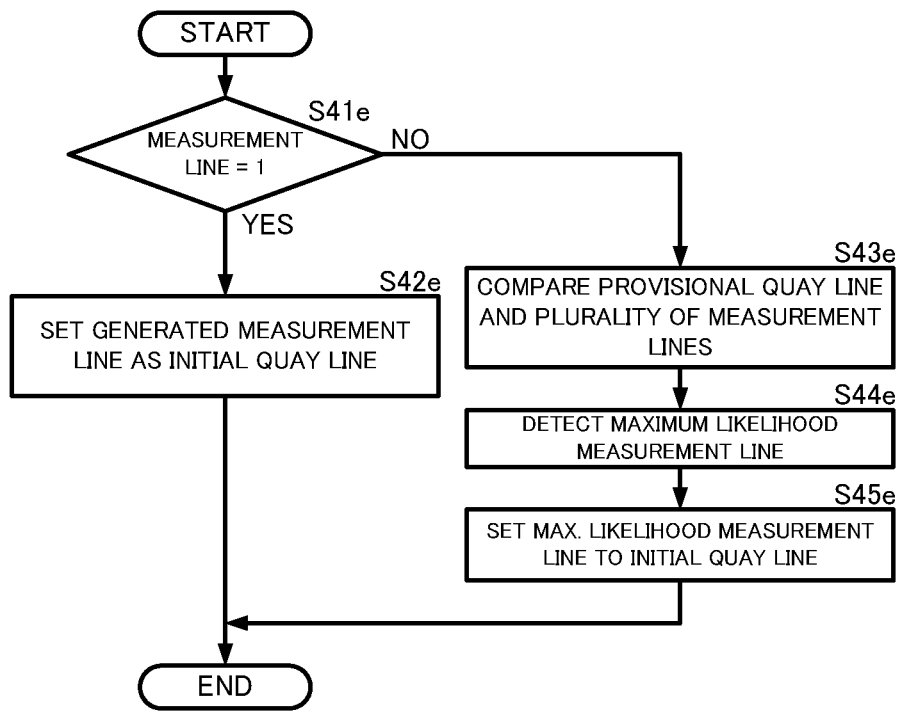

FIGS. 11A, 11B, and 11C are an example illustrating processing illustrated in FIGS. 9A, 9B, and 9C being set to a more concrete object (quay).

As illustrated in FIG. 11A, in the specifying process of the provisional quay line, the processing circuitry may capture an image including the quay line (S21e). The processing circuitry may accept an operational input for the image (S22e). The processing circuitry may set the provisional quay line from the contents of the operational input (S23e).

As illustrated in FIG. 11B, in the measurement line generating process, the processing circuitry may perform a three-dimensional ranging for the area including the quay line to detect a plurality of characteristic points (S31e). The processing circuitry may convert (project) the plurality of characteristic points obtained by three-dimensional coordinates into a two-dimensional coordinate system by using the attitude data of the ship (S32e). The processing circuitry may apply a given conversion process to the plurality of characteristic points disposed at the two-dimensional coordinates to generate the measurement line (S33e).

As illustrated in FIG. 11C, in the initial quay line setting process, if the number of measurement line is one (S41e: YES), the processing circuitry may set this measurement line (generated measurement line) as the initial quay line (S42e).

If there are a plurality of the measurement lines (S41e: NO), the processing circuitry may compare the provisional quay line and the plurality of the measurement lines (S43e). The processing circuitry may detect the maximum likelihood measurement line based on the comparison results (S44e). The processing circuitry may set the maximum likelihood measurement line as the initial quay line (S45e).

(Another Method of Setting Provisional Initial Information (Provisional Quay Line))

In the above explanation, the provisional initial information (provisional quay line) may be set by the user's operational input. However, it is also possible to set the provisional initial information based on the past data of the characteristic information on the object.

Figure 12:
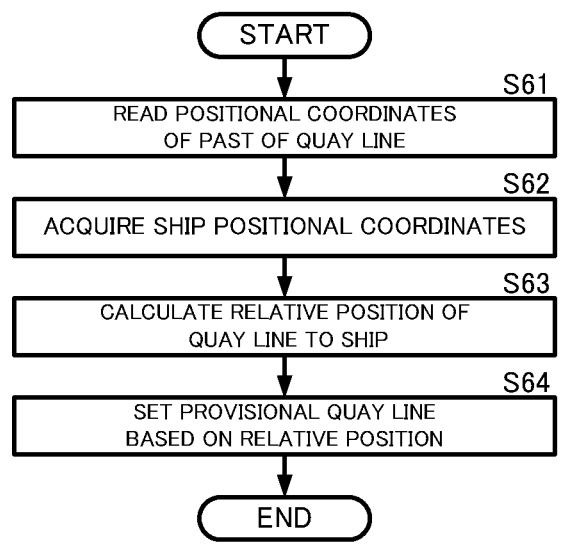
FIG. 12 is a flowchart illustrating a processing which sets the provisional initial information based on the past positional coordinates of the characteristic information on the object.

FIG. 12 is a flowchart illustrating a processing which sets the provisional initial information based on the past positional coordinates of the characteristic information on the object. Note that, here, the characteristic information on the object is the quay line, and the provisional initial information is the provisional quay line.

The processing circuitry may store the past positional coordinates of the quay line. The processing circuitry may read the past positional coordinates of the quay line (S61). The processing circuitry may acquire the positional coordinates of the ship (which anchors or docks to the object) (S62). The acquisition of the positional coordinates of the ship may be realizable, for example, by using the above-described positioning technique of the GNSS signals.

The processing circuitry may calculate a relative position of the quay line with respect to the ship by using these positional coordinates (S63). The processing circuitry may set the provisional quay line based on the relative position (S64). For example, the processing circuitry may convert the relative position into a vector quantity set by a distance and a direction on the basis of the ship, and set the provisional quay line.

Note that, here, the past positional coordinates of the quay line may be used. However, it is also possible to set a reference station to the quay line and a mobile station to the ship, to detect the relative position by using the technologies of DGPS or RTK, and to set the provisional quay line. Further, it is also possible to receive the coordinates of the quay line from external equipment and set the provisional quay line.

Further, in the above description, the example in which the quay is the object is illustrated. However, as long as the object is a pier, another ship, etc., which is an object to which the ship anchors, the above-described configuration and processing are applicable.

Further, in the above description, the example in which the straight line (line segment) is used as the characteristic information is illustrated. However, it is also possible to use a point, a surface, or a curve as the characteristic information, and, also in these cases, the above-described configuration and processing are applicable.

Figure 13:
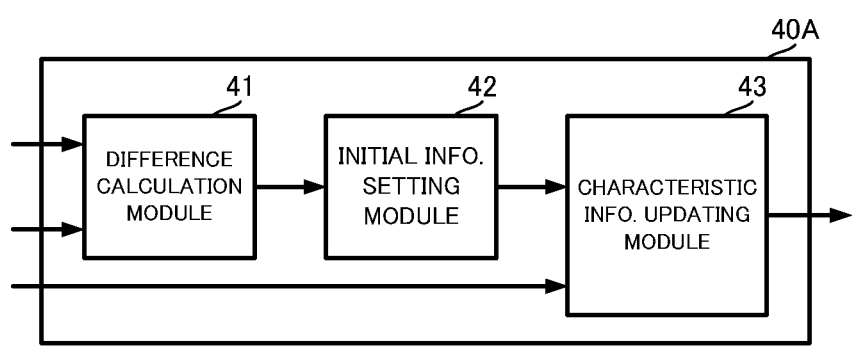
FIG. 13 is a functional block diagram illustrating a configuration of processing circuitry when containing a processing to update a characteristic information.

In the above explanation, the initial information of the characteristic information of the target is set. However, the ship navigation assistance system can additionally update the characteristic information sequentially. In this case, for example, the processing circuitry may have the following configuration and perform the following processing. FIG. 13 is a functional block diagram illustrating a configuration of processing circuitry when containing a processing to update a characteristic information.

As illustrated in FIG. 13, processing circuitry 40A may include a difference calculation module 41, the initial information setting module 42, and a characteristic information updating module 43. Note that the processing circuitry 40A differs from the processing circuitry 40 in that the characteristic information updating module 43 is further provided. Other configurations of the processing circuitry 40A are similar to those of the processing circuitry 40, and description of the similar modules is omitted.

The characteristic information updating module 43 may receive the initial information from the initial information setting module 42 and the measurement information from the measurement sensor 30.

The characteristic information updating module 43 may calculate the characteristic information using the initial information and the measurement information. In more detail, the characteristic information updating module 43 may calculate a difference between each of the initial information and a plurality of the measurement information. The characteristic information updating module 43 may set a weighting coefficient for each of the measurement information according to each difference. The characteristic information updating module 43 may calculate the characteristic information using the weighting coefficient and a plurality of the measurement information. For example, the characteristic information updating module 43 may calculate the characteristic information by multiplying a plurality of the measurement information by a weighting coefficient and summing the multiplication results.

The characteristic information updating module 43 may output the characteristic information and may make use of it to calculate the next characteristic information. That is, when the characteristic information is already calculated, the characteristic information updating module 43 may calculate the new characteristic information using the characteristic information and the newly input (acquired) plurality of the measurement information. Specifically, the characteristic information updating module 43 may calculate the difference between the characteristic information and a plurality of the measurement information respectively. The characteristic information updating module 43 may set a weighting a coefficient for each of the plurality of the measurement information according to each difference. The characteristic information updating module 43 may calculate the characteristic information using the weighting coefficient and the plurality of the measurement information. For example, the characteristic information updating module 43 may calculate the new characteristic information by multiplying the plurality of the measurement information by a weighting coefficient and adding the multiplication result.

Hereinafter, by repeating this processing, the characteristic information updating module 43 may sequentially update the characteristic information.

By such a configuration and processing, the characteristic information (for example, a quay line) may be updated with high accuracy.

DESCRIPTION OF REFERENCE CHARACTERS

10: Ship Navigation Assistance System (Device)
20: Provisional Initial Information Specifier
21: Image capturer (Camera)
22: Operational Input Interface (Provisional object detector)
23: Provisional Initial Information Specifier
30: Measurement Sensor
31: Rangefinder
32: Attitude Measurement Sensor
33: Measurement Information Generator Module
40, 40: Processing Circuitry 41: Difference Calculation Module
42: Initial Information Setting Module
43: Characteristic Information Updating Module
81, 82, 83, 84, 85, 86, 87: Characteristic Point
90: Quay
910: Quay Line
920: Provisional Quay Line
931, 932, 933, 934, 935, 936, 937: Measurement Line Terminology It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A ship navigation assistance system, comprising:
   a provisional initial information specifier, comprising a camera, configured to accept a specification of provisional initial information for characteristic information of an object to which a ship intends to anchor or dock;
   a measurement sensor configured to acquire measurement information on the object using a ranging result of an area including the object;
   processing circuitry configured to:
   set initial information of the characteristic information of the object using the provisional initial information and the measurement information;
   calculate a difference between each pair of the provisional initial information and the measurement information when there are a plurality of the measurement information;
   detect the measurement information which constitutes the least difference pair with the provisional initial information;
   set the measurement information as the initial information of the characteristic information; and
   control the anchoring of the ship based on the set measurement information as the initial information of the characteristic information to suppress an error of the initial information of the object.

2. The ship navigation assistance system of claim 1, wherein
   the processing circuitry is further configured to set the measurement information as the initial information of the characteristic information when a distance difference between a distance from the ship to the measurement information and a distance from the ship to the provisional initial information is minimum.

3. The ship navigation assistance system of claim 2, wherein
   the measurement sensor is further comprising:
   a rangefinder configured to perform three-dimensional ranging of the area including the object; and
   measurement information generation circuitry configured to:
   convert a result of the three-dimensional ranging into a two-dimensional coordinate system; and
   generate the measurement information.

4. The ship navigation assistance system of claim 1, wherein
   the processing circuitry is further configured to set the measurement information as the initial information of the characteristic information when a direction difference between a direction from the ship to the measurement information and a direction from the ship to the provisional initial information is minimum.

5. The ship navigation assistance system of claim 4, wherein the measurement sensor is further comprising:
   a rangefinder configured to perform three-dimensional ranging of the area including the object; and
   measurement information generation circuitry configured to:
   convert a result of the three-dimensional ranging into a two-dimensional coordinate system; and
   generate the measurement information.

6. The ship navigation assistance system of claim 1, wherein the measurement sensor is further comprising:
   a rangefinder configured to perform three-dimensional ranging of the area including the object; and
   measurement information generation circuitry configured to:
   convert a result of the three-dimensional ranging into a two-dimensional coordinate system; and
   generate the measurement information.

7. The ship navigation assistance system of claim 6, wherein the rangefinder is further comprising an optical rangefinder.

8. The ship navigation assistance system of claim 7, wherein the measurement sensor is further comprising:
   an attitude measurement sensor configured to measure an attitude of the ship, and
   wherein the measurement information generation circuitry is further configured to convert a result of the three-dimensional ranging into a two-dimensional coordinate system by utilizing the attitude of the ship.

9. The ship navigation assistance system of claim 6, wherein the measurement sensor is further comprising:
   an attitude measurement sensor configured to measure an attitude of the ship, and wherein the measurement information generation circuitry is further configured to convert a result of the three-dimensional ranging into a two-dimensional coordinate system by utilizing the attitude of the ship.

10. The ship navigation assistance system of claim 1, wherein the provisional initial information specifier is further comprising:
    an image capturer, including the camera, configured to capture an image including the object;
    an operational input interface, including a touch panel, configured to accept an operational input for the image; and
    provisional initial information setting circuitry configured to set the provisional initial information based on the operational input.

11. The ship navigation assistance system of claim 1, wherein the provisional initial information specifier is further comprising:
    an image capturer, including the camera, configured to capture an image including the object;
    a provisional object detector, including a touch panel, configured to detect a provisional object on the object from the captured image; and provisional initial information setting circuitry configured to set the provisional initial information based on the provisional object.

12. The ship navigation assistance system of claim 11, wherein
the provisional initial information setting circuitry is further configured to set the provisional initial information based on past positional coordinates of the object and positional coordinates of the ship.

13. The ship navigation assistance system of claim 1, wherein
the characteristic information of the object is a quay line.

14. The ship navigation assistance system of claim 1, wherein
the processing circuitry is further configured to update the characteristic information of the object using the initial information of the object, or the characteristic information before updating on the object and the measurement information.

15. A ship navigation assistance method, comprising:
accepting a specification of provisional initial information for characteristic information of an object to which a ship intends to anchor or dock;
acquiring measurement information on the object using a ranging result of an area including the object;
setting initial information of the characteristic information on the object using the provisional initial information and the measurement information;
calculating a difference between each pair of the provisional initial information and the measurement information when there are a plurality of the measurement information;
detecting the measurement information which constitutes the least difference pair with the provisional initial information;
setting the measurement information as the initial information of the characteristic information; and
controlling the anchoring of the ship based on the set measurement information as the initial information of the characteristic information to suppress an error of the initial information of the object suppress an error of the initial information of the object.

16. A non-transitory computer readable medium storing instruction that, when executed by processing circuitry, causes a computer system to perform a method comprising:
accepting a specification of provisional initial information for characteristic information of an object to which a ship intends to anchor or dock;
acquiring measurement information on the object using a ranging result of an area including the object;
setting initial information of the characteristic information on the object using the provisional initial information and the measurement information;
calculating a difference between each pair of the provisional initial information and the measurement information when there are a plurality of the measurement information;
detecting the measurement information which constitutes the least difference pair with the provisional initial information;
setting the measurement information as the initial information of the characteristic information; and
controlling the anchoring of the ship based on the set measurement information as the initial information of the characteristic information to suppress an error of the initial information of the object suppress an error of the initial information of the object.

* * * * *